(12) United States Patent
Yen et al.

(10) Patent No.: US 10,250,116 B2
(45) Date of Patent: Apr. 2, 2019

(54) CONTROL CIRCUIT FOR REDUCING POWER LOSS OF LLC RESONANT CONVERTER DURING LIGHT-LOAD OR NO-LOAD OPERATION

(71) Applicant: MEANWELL (GUANGZHOU) ELECTRONICS CO., LTD, Guangzhou (CN)

(72) Inventors: Ying-Hung Yen, New Taipei (TW); Chih-Yuan Chang, New Taipei (TW)

(73) Assignee: MEANWELL (GUANGZHOU) ELECTRONICS CO., LTD. (CN)

( * ) Notice: Subject to any disclaimer, the term of this patent is extended or adjusted under 35 U.S.C. 154(b) by 0 days.

(21) Appl. No.: 15/693,476

(22) Filed: Sep. 1, 2017

(65) Prior Publication Data

US 2019/0074759 A1    Mar. 7, 2019

(51) Int. Cl.
*H02M 3/335* (2006.01)
*H02M 1/08* (2006.01)
*H02M 1/00* (2006.01)

(52) U.S. Cl.
CPC ......... *H02M 1/08* (2013.01); *H02M 3/33523* (2013.01); *H02M 2001/0048* (2013.01)

(58) Field of Classification Search
CPC .... H02M 3/28; H02M 3/156; H02M 3/33507; H02M 3/33561; H02M 3/33569; H02M 2007/4815; Y02B 70/1433; Y02B 70/1441
See application file for complete search history.

(56) References Cited

U.S. PATENT DOCUMENTS

2009/0097280 A1*    4/2009  Wu ............... H02M 3/33592
                                                363/17

* cited by examiner

*Primary Examiner* — Nguyen Tran
*Assistant Examiner* — Monica Mata

(57) ABSTRACT

The present invention particularly discloses a control circuit comprising a signal detection unit and a controller unit for reducing power loss of a LLC resonant converter during light-load or no-load operation. In the present invention, the signal detection unit is adopted for sensing a primary-side current from a transformer unit of the LLC resonant converter, and then converting the primary-side current to a reference voltage signal. Thus, according to a level variation of the reference voltage signal, the controller unit is able to properly regulate duty cycle of a switch controlling signal based on a duty cycle reduction percentage. Eventually, by using the switch controlling signal to control the periodic ON-OFF switching of power switches, power loss of the LLC resonant converter operated under light load or no load can be obviously reduced; moreover, working temperature of the power switches is simultaneously lowered.

7 Claims, 6 Drawing Sheets

US 10,250,116 B2

CONTROL CIRCUIT FOR REDUCING POWER LOSS OF LLC RESONANT CONVERTER DURING LIGHT-LOAD OR NO-LOAD OPERATION

BACKGROUND OF THE INVENTION

1. Field of the Invention

The present invention relates to the technology field of electronic circuits, and more particularly to a control circuit for reducing power loss of LLC resonant converter during light-load or no-load operation.

2. Description of the Prior Art

Technologies of switching-mode power supply (SMPS) have been widely applied in manufacture of power supplies for various electrical apparatuses and electronic products. Moreover, since there has a tendency toward developing small-size and light-weight electronic products today, power density of the SMPS needs to be enhanced through raising switching frequency in order to effectively shrink the SMPS's framework volume. However, in practice, even though to raise switching frequency can indeed facilitate the SMPS use small-size magnetic components and capacitors, this way would simultaneously cause the incensement of switching loss produced by power switches in the SMPS, and also bring the SMPS into being subject to electromagnetic interference (EMI) more easily.

Accordingly, LLC resonant converter with advantages of zero voltage switching (ZVS) and zero current switching (ZCS) is hence developed and proposed. FIG. 1 shows a circuit framework diagram of a conventional LLC resonant converter. As FIG. 1 shows, the conventional LLC resonant converter 2' comprises: a power switch unit 23' coupled with a DC source $V_{DC}'$, a resonator unit 24', a transformer unit 25', an output rectification unit 26', and a low-pass filter unit 27', wherein a closed loop controller module 1' is electrically connected between output terminals of the LLC resonant converter 2' and the power switch unit 23'. Moreover, FIG. 1 also indicates that the said closed loop controller module 1' mainly comprises a signal detection unit 11', a controller 12', and a driving unit 13'.

For making the LLC resonant converter 2' steadily supply an output current/voltage to a load 3', a first switch controlling signal and a second switch controlling signal are generated by the closed loop controller module 1' and alternately inputted to a first power switch and a second power switch in the power switch unit 23'. Herein, it needs to further explain that, there is a spacing time called "dead time" existing between the first switch controlling signal and the second switch controlling signal. Moreover, when the LLC resonant converter 2' works under a light-load operation, the closed loop controller module 1' is configured to immediately stabilize the output current/voltage of the LLC resonant converter 2' by raising the switching frequency of the power switch unit 23'. However, the output voltage of the LLC resonant converter 2' would go up with occurrence of parasitic stray capacitance during the high frequency switching of the power switch unit 23'. Therefore, for the purpose of reducing switching loss of the LLC resonant converter 2' during light-load or no-load operation, researchers and power supply manufacturers are developed and proposed several improvement approaches.

First of all, at least one dummy load is connected to the output terminals of the LLC resonant converter 2' for attenuating the parasitic stray capacitance during light-load or no-load operation. However, it is a pity that the addition of the dummy load does not only enlarge the whole framework volume of the LLC resonant converter 2', but also lead to reduction of the power conversion efficiency of the LLC resonant converter 2'. On the other hand, second improvement approach utilizes a burst mode controller connected to a primary side of the transformer unit 25' to control the LLC resonant converter 2' to work at an burst mode during light-load or no-load operation. In burst mode, the switch controlling signal are particularly set to comprises at least one nearly-fixed frequency switching period consisting of a series of switching cycles and at least one long idle period, wherein the power switches are in OFF-state or the duty cycle of the switch control signal is set to zero during the long idle period. By implementing the second improvement approach into the LLC resonant converter 2', the average switching frequency can be considerable lowered, thereby reducing the switching loss of the LLC resonant converter 2'.

However, the above-mentioned second improvement approach still exhibits a primary drawback, that is, the LLC resonant converter 2' would produce a noise with audio frequency when the power switch unit 23' works at the burst mode based the controlling of the burst mode controller. Furthermore, when applying a third improvement approach to the LLC resonant converter 2', the closed loop controller module 1' is configured to treat the first switch controlling signal and the second switch controlling signal inputted to the power switch unit 23' with a variable-frequency (VF) process and/or a phase shifting (PS) process. It is easy to presume and understand that, multi types of circuit chips must be added into the closed loop controller module 1' in order to implement the third improvement approach into the LLC resonant converter 2', such that both complexity of the closed loop controller module 1' and whole manufacturing cost of the LLC resonant converter 2' raises.

From above descriptions, it is clear that there is no an ideal improvement approach or solution for effectively solving the phenomenon of switching loss occurring as an LLC resonant converter is operated under light load or no load; in view of that, inventors of the present application have made great efforts to make inventive research thereon and eventually provided a control circuit for reducing power loss of LLC resonant converter during light-load or no-load operation.

SUMMARY OF THE INVENTION

Conventional controlling technology cannot effectively reduce switching loss occurring as an LLC resonant converter is operated under light load or no load. In view of that, the present invention discloses a control circuit comprising a signal detection unit and a controller unit for reducing power loss of the LLC resonant converter during light-load or no-load operation. In the present invention, the signal detection unit is adopted for sensing a primary-side current from a transformer unit of the LLC resonant converter, and then converting the sensed primary-side current to a reference voltage signal. Thus, according to a level variation of the reference voltage signal, the controller unit is able to properly regulate duty cycle of a switch controlling signal based on a duty cycle reduction percentage. Eventually, by using the switch controlling signal to control the periodic ON-OFF switching of power switches of the LLC resonant converter, power loss of the LLC resonant converter operated under light load or no load can be obviously reduced; moreover, working temperature of the power switches is simultaneously lowered.

For achieving the primary objective of the present invention, the inventor of the present invention provides an embodiment for the control circuit, which is used in an LLC resonant converter at least comprising a resonator unit, a transformer unit and a power switch unit for controlling energy transmission of the resonator unit and the transformer unit, and comprises:
a signal detection unit, being electrically connected to a primary side of the transformer unit for sensing a current sampling signal, so as to convert the current sampling signal to a reference voltage signal; and
a controller unit, being electrically connected to the signal detection unit for receiving the reference voltage signal, so as to output at least one switch controlling signal to the power switch;
wherein a level variation of the reference voltage signal is referred by the controller unit, such that the controller unit is configured to properly regulate a duty cycle of the switch controlling signal based on a duty cycle reduction percentage as the LLC resonant converter is under a light-load or a no-load operation;
wherein the duty cycle reduction percentage is a ratio between a light-load duty cycle and a basic duty cycle.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a control circuit for reducing power loss of LLC resonant converter during light-load or no-load operation according to the present invention, embodiments of the present invention will be described in detail with reference to the attached drawings hereinafter.

First Embodiment

Figure 1:
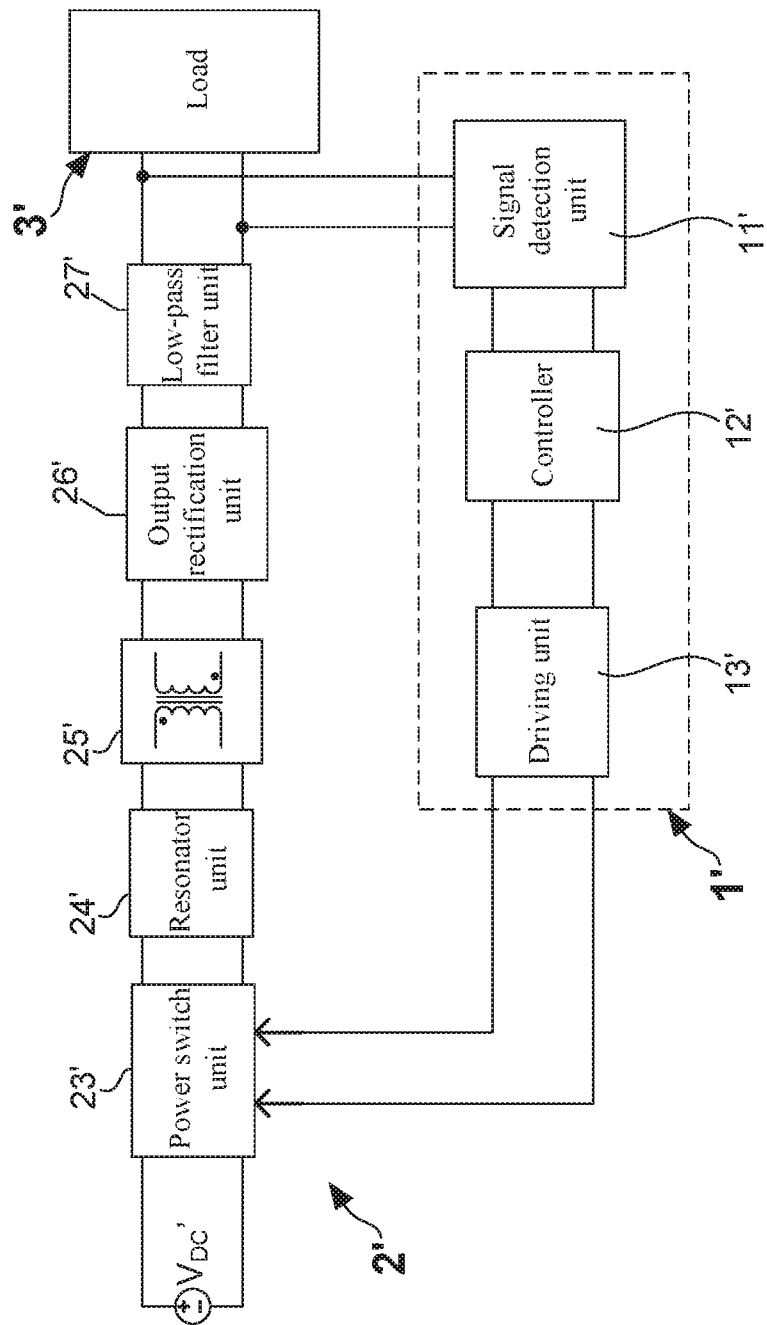
FIG. 1 shows a circuit framework diagram of a conventional LLC resonant converter.
Figure 2:
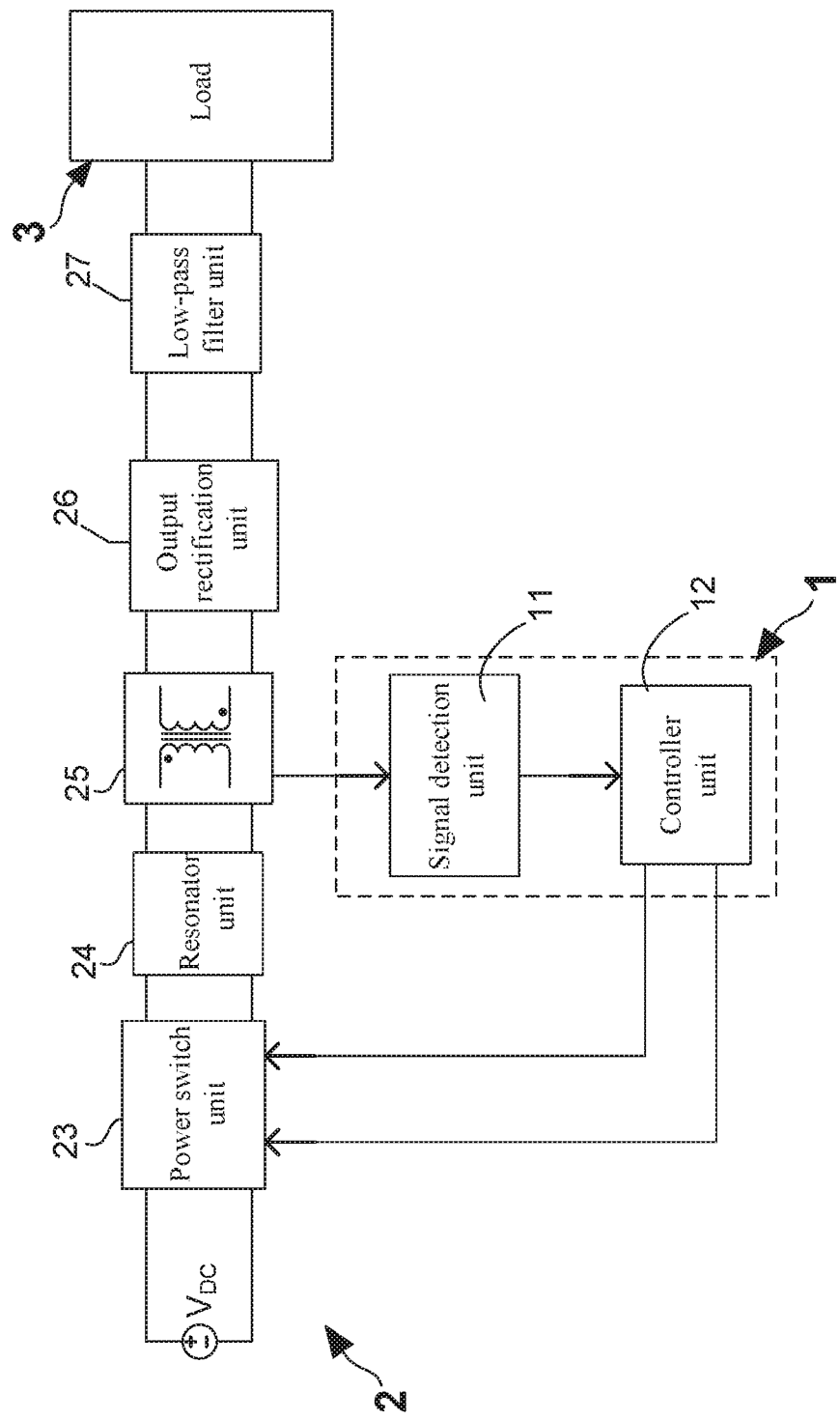
FIG. 2 shows a circuit block diagram of an LLC resonant converter having a control circuit of the present invention.
Figure 3:
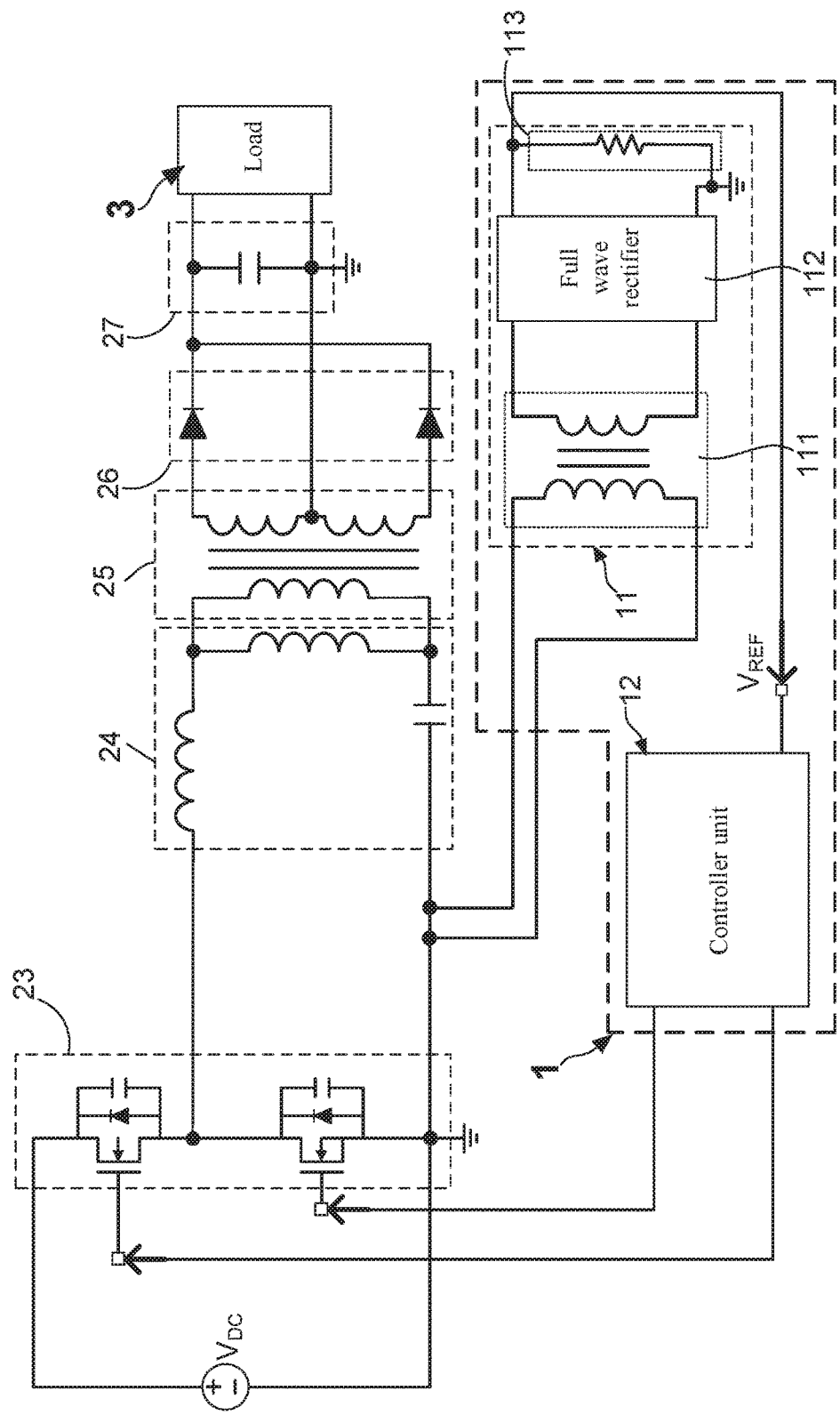
FIG. 3 shows a circuit framework diagram of a first embodiment of the control circuit.

With reference to FIG. 2, there is provided a circuit block diagram of an LLC resonant converter having a control circuit of the present invention. As FIG. 2 shows, the LLC resonant converter 2 at least comprises: a power switch unit 23 coupled with a DC source $V_{DC}$, a resonator unit 24, a transformer unit 25, an output rectification unit 26, and a low-pass filter unit 27, wherein the power switch unit 23 is used for controlling energy transmission of the resonator unit 24 and the transformer unit 25. Please continuously refer to FIG. 3, which illustrates a circuit framework diagram of the first embodiment of the control circuit. FIG. 2 and FIG. 3 indicate that the control circuit 1 of the present invention is applied in the LLC resonant converter 2 and mainly comprises a signal detection unit 11 and a controller unit 12.

In the present invention, the signal detection unit 11 is constituted by a current transformer 111, a full wave rectifier 112 and a current-voltage converter 113, wherein the current transformer 111 is electrically connected to a primary side of the transformer unit 25 and used for seining a current sampling signal from the primary side of the transformer unit 25 according to a current shrinking ratio (such as 1:100). Subsequently, the sensed current sampling signal is treated with a rectifying process by the full wave rectifier 112 electrically connected to the current transformer 111. Eventually, the current-voltage converter 113 electrically connected to the full wave rectifier 112 converts the rectified current sampling signal to a reference voltage signal $V_{REF}$. In the first embodiment of the control circuit 1, the simplest model of the current-voltage converter 113 is a resistor set.

Continuously referring to FIG. 2 and FIG. 3, wherein the controller unit 12 is electrically connected to the signal detection unit 11 for receiving the reference voltage signal $V_{REF}$. In the present invention, a level variation of the reference voltage signal $V_{REF}$ is referred by the controller unit 12, such that the controller unit 12 is configured to properly regulate a duty cycle of a switch controlling signal based on a duty cycle reduction percentage as the LLC resonant converter 2 is under a light-load or a no-load operation. Therefore, by using this duty-cycle-modulated switch controlling signal to control the periodic ON-OFF switching of the power switch unit 23, power loss occurring as the LLC resonant converter 2 works under light load or no load operation are obviously reduced. On the contrary, when the operation state of the LLC resonant converter 2 transits from light load or no load to a normal load, the controller unit 12 immediately regulates the duty cycle of the switch controlling signal based on a duty cycle increment percentage.

Figure 4:
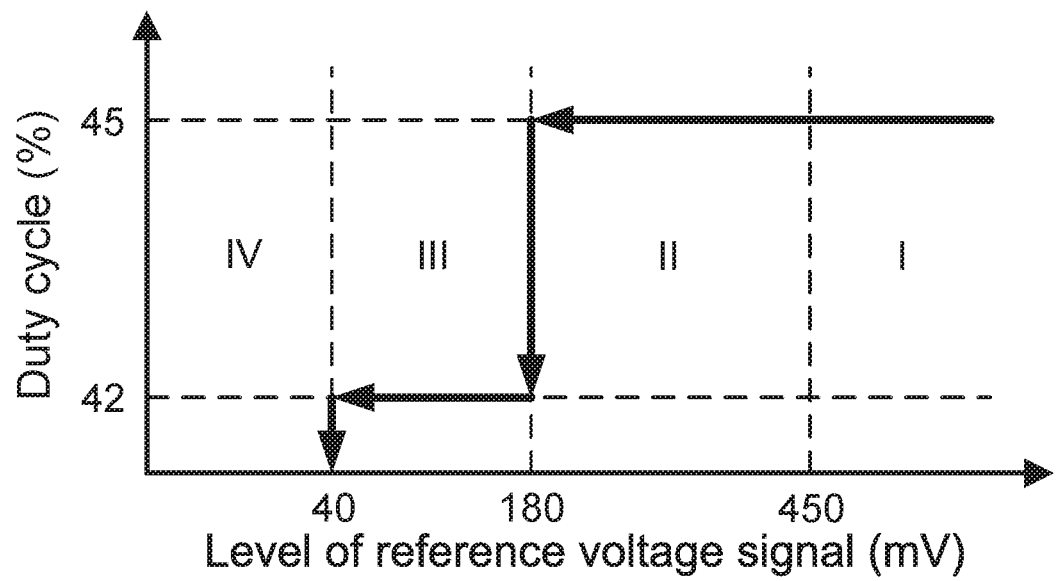
FIG. 4 and FIG. 5 show curve graphs of level of reference voltage signal versus duty cycle.

Experimental data will be provided in following paragraphs for more detailedly explaining the way carried out by this control circuit 1 to reduce the switching loss of the LLC resonant converter 2 through regulating the duty cycle of the switch controlling signal based on a duty cycle reduction percentage. Please refer to FIG. 4, where a curve graph of level of reference voltage signal versus duty cycle is shown. It is worth noting that, regions I, II, III, and IV are displayed by FIG. 4, wherein representing meanings of these four regions are integrated in following Table (1). Moreover, from Table (1) and FIG. 4, it can find that the level of the reference voltage signal $V_{REF}$ is equal to or greater than 180 mV as the LLC resonant converter 2 works in normal load operation. In addition, it can be understood that "$V_{REF}$<180 mV" means the operation state of the LLC resonant converter 2 does transit from normal load to light load. Therefore, once the level of the reference voltage signal $V_{REF}$ is less than 180 mV, the controller unit 12 would immediately down-regulate the duty cycle of the switch controlling signal from 45% to 42%, wherein the duty cycle reduction percentage is 93.3%.

TABLE (1)

| Region | Level of the reference voltage signal | Duty cycle of the switch controlling signal |
|---|---|---|
| I | $V_{REF}$ ≥ 450 mV | 45% |
| II | 180 mV ≤ $V_{REF}$ < 450 mV | 45% (Hysteresis region) |
| III | 40 mV ≤ $V_{REF}$ < 180 mV | 45%→42% |
| IV | $V_{REF}$ < 40 MV | 0 |

In the experiments, 42% is regarded as a light-load duty cycle. Moreover, it is worth noting that, the controller unit 12 generates a switch controlling signal with a basic duty cycle of 50% to the power switch unit 23 at an ideal state, in order to facilitate the LLC resonant converter 2 provide a steady output voltage/current to load(s) 3. However, considering the precision of different controller units 12 and the sensitivity of electronic components used in the LLC resonant converter 2 would not be identical, the basic duty cycle is set to 45% in experiments for testing the efficiency of the control circuit 1 implemented in the LLC resonant converter 2. Briefly speaking, owing to the characteristics discrepancy of the electronic chips and components for constituting the LLC resonant converter 2, the said basic duty cycle would be in a range from 45% to 45% instead of a constant value; and likewise, the said light-load duty cycle is also not a constant value, which is less than the basic duty cycle. Therefore, the present invention particularly let the duty cycle reduction percentage be in a range between 88% and 99%.

It needs to further explain that, the controller unit 12 is able to determine either the LLC resonant converter 2 is under a full-load or the light-load operation based the reference voltage signal $V_{REF}$ generated by the signal detection unit 11. According to practical experiences of engineers and related experimental data, 70 percent or less of the reference voltage signal $V_{REF}$ obtained during the full-load operation is equal to the reference voltage signal $V_{REF}$ got during the light-load operation. Moreover, it is worth describing that the LLC resonant converter 2 works at a fixed frequency mode in the experiments. Thus, when the controller unit 12 finds the operation state of the LLC resonant converter 2 transits from the normal load to the light load or no load, the controller unit 12 immediately changes the basic duty cycle of the switch controlling signal to the light-load duty cycle based on the duty cycle reduction percentage.

Following Table (2) has recorded a variety of experimental data including power loss and working temperature of the power switch unit 23 measured as the LLC resonant converter 2 is under the light-load operation. From Table (2), it is found that the working temperature of the power switch unit 23 abruptly goes up to 100° C. while the operation state of the LLC resonant converter 2 transits from normal load to light load under the basic duty cycle being set to 45%. In the meantime, a power consumption of 19.8 W induced by switching losses of the power switch unit 23 occurs in the LLC resonant converter 2. However, it is worth noting that, after the duty cycle of the switch controlling signal is modulated from 45% to 42% by the controller unit 12, the working temperature of the power switch unit 23 immediately cools down to 40° C.; moreover, the power consumption of the LLC resonant converter 2 is also reduced to 9.8 W. Thus, the experimental data have proved that the control circuit 1 of the present invention can indeed be used for reducing power loss of the LLC resonant converter 2 during light-load or no-load operation.

TABLE (2)

| | Duty cycle | | | | |
|---|---|---|---|---|---|
| | 45% | 43% | 42% | 40% | 35% |
| Working temperature | 100° C. | 55° C. | 40° C. | 31° C. | — |

TABLE (2)-continued

| | Duty cycle | | | | |
|---|---|---|---|---|---|
| | 45% | 43% | 42% | 40% | 35% |
| Power loss | 19.8 W | 14.1 W | 9.2 W | 5.5 W | 2.4 W |

Figure 5:
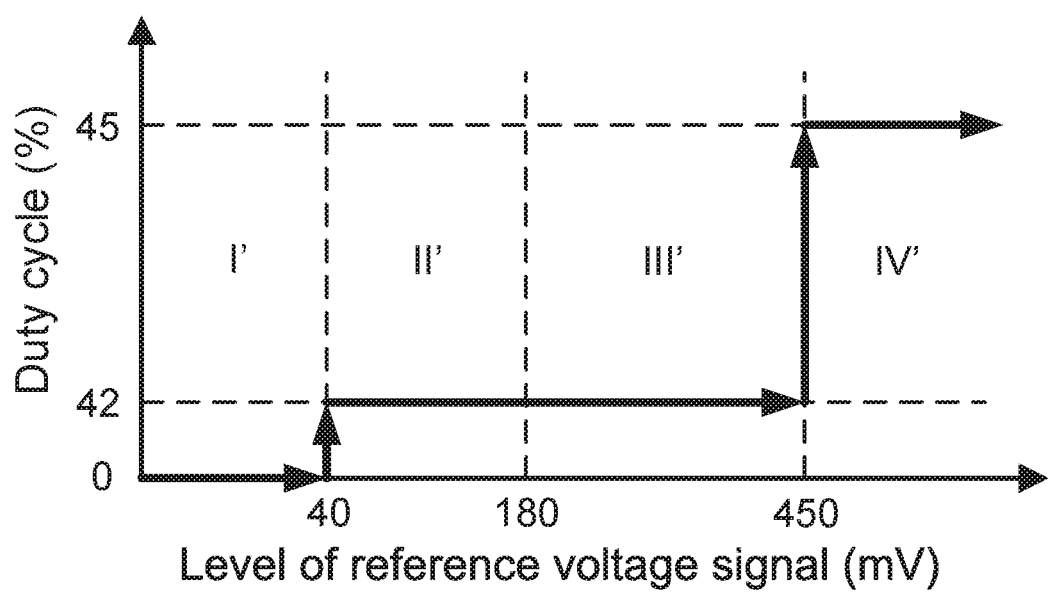

Please continuously refer to FIG. 5, where a curve graph of level of reference voltage signal versus duty cycle is shown. It is worth noting that, regions I', II', III', and IV' are displayed by FIG. 5, wherein representing meanings of these four regions are integrated in following Table (3). From Table (3) and FIG. 5, it can find that, the level of the reference voltage signal $V_{REF}$ is lower than 40 mV as the LLC resonant converter 2 works in no-load operation, and meanwhile the duty cycle is set to zero. In addition, it is understood that "$V_{REF} \geq 40$ mV" means the operation state of the LLC resonant converter 2 does transit from no load to light load. Therefore, once the level of the reference voltage signal $V_{REF}$ is higher than 40 mV, the controller unit 12 would immediately up-regulate the duty cycle of the switch controlling signal from 0 to 42%.

Furthermore, when the level of the reference voltage signal $V_{REF}$ is higher than or equal to 450 mV, the duty cycle of the switch controlling signal would be changed from 42% to 45%, and that means the duty cycle increment percentage is 107%. Owing to the characteristics discrepancy of the electronic chips and components for constituting the LLC resonant converter 2, the said duty cycle increment percentage would be in a range from 102% to 112% instead of a constant value.

TABLE (3)

| Region | Level of the reference voltage signal | Duty cycle of the switch controlling signal |
|---|---|---|
| I' | $V_{REF} < 40$ MV | 0 |
| II' | 40 mV $\leq V_{REF} < 180$ mV | 0→42% |
| III' | 180 mV $\leq V_{REF} < 450$ mV | 42% (Hysteresis region) |
| IV' | $V_{REF} \geq 450$ mV | 45% |

Second Embodiment

Figure 6:
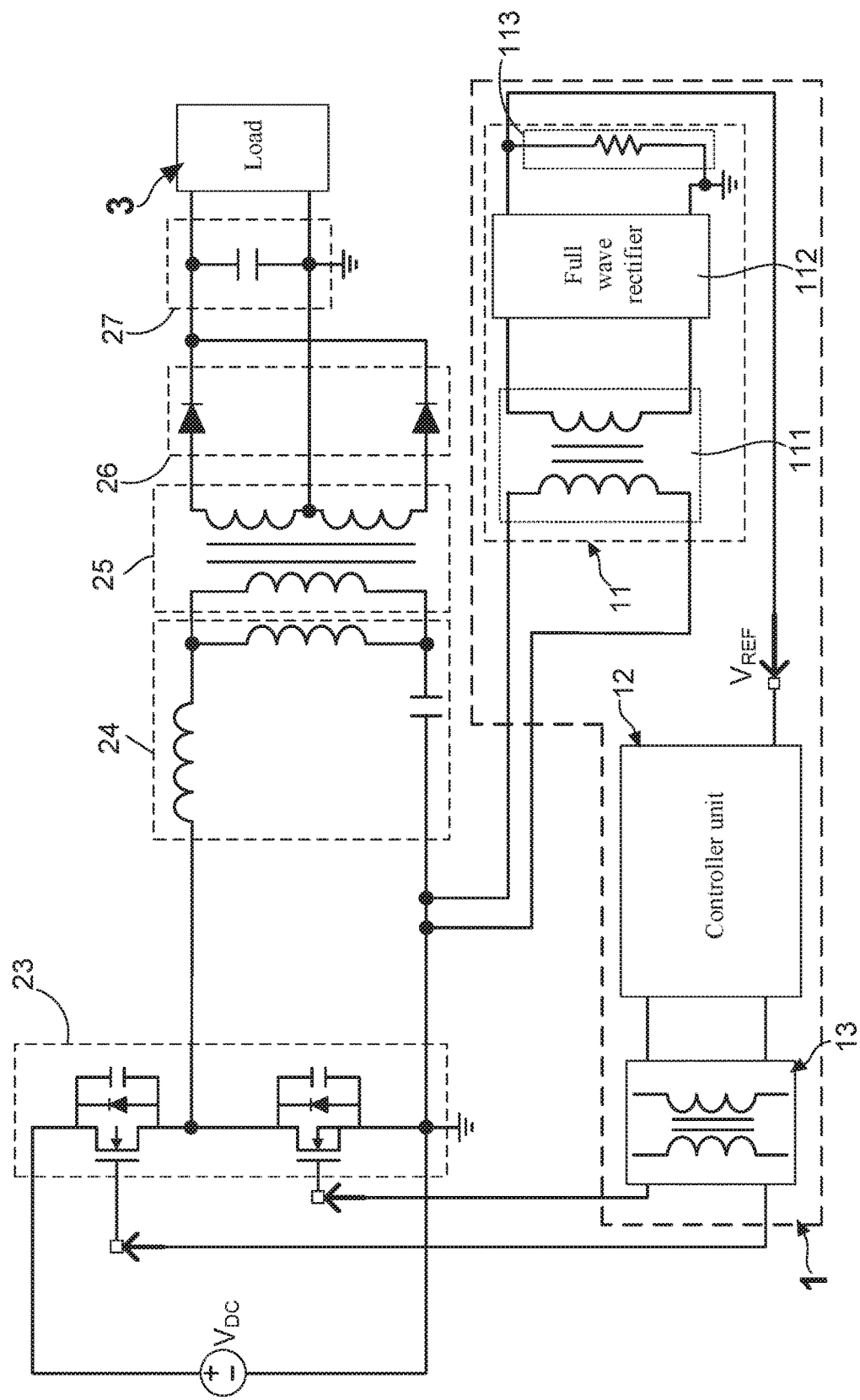
FIG. 6 shows a circuit framework diagram of a second embodiment of the control circuit.

With reference to FIG. 6, there is provided a circuit framework diagram of a second embodiment of the control circuit. After comparing FIG. 3 with FIG. 6, it is found that the second embodiment of the control circuit 1 can be obtained by adding an isolation transformer unit 13 into the circuit framework of the first embodiment. As FIG. 6 shows, the an isolation transformer unit 13 is electrically connected between the controller unit 12 and the power switch unit 23, and used for preventing the controller unit 12 from being damaged by DC source $V_{DC}$.

Third Embodiment

Figure 7:
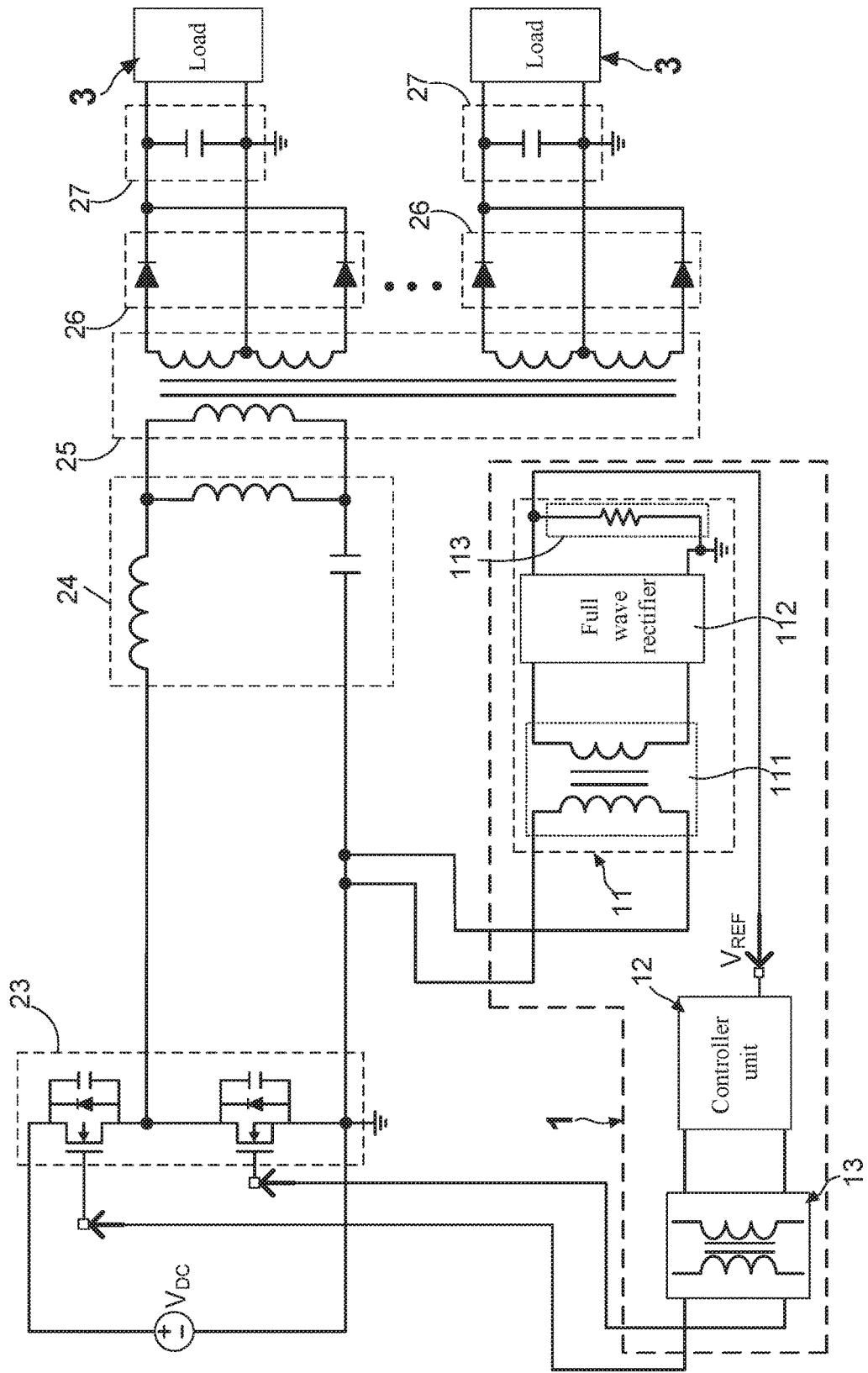
FIG. 7 shows a circuit framework diagram of a third embodiment of the control circuit.

Please continuously pay attention to a circuit framework diagram of a third embodiment of the control circuit provided in FIG. 7. After comparing FIG. 6 with FIG. 7, it is easy to know that the LLC resonant converter 2 shown in FIG. 7 is a DC/DC power converter with multiple outputs. In the DC/DC power converter with multiple outputs, the transformer unit 25 has a primary-side winding and a plurality of secondary-side windings; moreover, each of the secondary-side windings being connected with one output rectification unit 26 and a low-pass filter unit 27. It is worth explaining that, since the transformer unit 25 with one primary-side winding and multiple secondary-side windings is modularized, the output rectification unit 26 and the low-pass filter unit 27 can be integrated as a circuit module with one electrical connector for connecting to the load 3. Moreover, such circuit module is called power module. Particularly, implementation of power modules facilitates the number of outputs of the LLC resonant converter 2 be added or removed more easily. Besides, a DC/DC converter such as buck converter, boost converter or buck/boost converter can be further added into the circuit framework of the LLC resonant converter 2, wherein the DC/DC converter is connected between the low-pass filter unit 27 and the load 3, and configured for stabilizing the output of the LLC resonant converter 2. Moreover, the load 3 can be an LED device or a plurality of LED devices.

Therefore, through above descriptions, the control circuit for reducing power loss of LLC resonant converter during light-load or no-load operation have been introduced completely and clearly; in summary, the present invention includes the advantages of:

(1) Differing from the fact that the conventional controlling technology cannot effectively reduce switching loss occurring as an LLC resonant converter is operated under light load or no load, the present invention discloses a control circuit comprising a signal detection unit and a controller unit for reducing power loss of the LLC resonant converter during light-load or no-load operation. In the present invention, the signal detection unit is adopted for sensing a primary-side current from a transformer unit of the LLC resonant converter, and then converting the sensed primary-side current to a reference voltage signal. Thus, according to a level variation of the reference voltage signal, the controller unit is able to properly regulate duty cycle of a switch controlling signal based on a duty cycle reduction percentage. Eventually, by using the switch controlling signal to control the periodic ON-OFF switching of power switches of the LLC resonant converter, power loss of the LLC resonant converter operated under light load or no load can be obviously reduced; moreover, working temperature of the power switches is simultaneously lowered.

(2) On the other hand, circuit units of this control circuit 1 are almost constituted by elemental electronic components except the controller unit 12 being a micro circuit chip. Apparently, in contrast to conventional technology using a few electronic chips to constitute a closed loop control circuit, the control circuit 1 of the present invention exhibits advantages of simple circuit topology and low manufacturing cost.

The above description is made on embodiments of the present invention. However, the embodiments are not intended to limit scope of the present invention, and all equivalent implementations or alterations within the spirit of the present invention still fall within the scope of the present invention.

What is claimed is:

1. A control circuit for use in an LLC resonant converter, wherein the LLC resonant converter at least comprises a resonator unit, a transformer unit and a power switch unit for controlling energy transmission of the resonator unit and the transformer unit; wherein the control circuit comprises:
   a signal detection unit, comprising:
      a current transformer, being electrically connected to the resonator unit by a primary-side winding thereof, used for producing a current sampling signal;
      a full wave rectifier, being electrically connected to a secondary-side winding of the current transformer for applying a rectifying process to the current sampling signal; and
      a resistor, being electrically connected to the full wave rectifier, used for converting the rectified current sampling signal to a reference voltage signal; and
   a controller unit, being electrically connected to the signal detection unit for receiving the reference voltage signal, so as to output at least one switch controlling signal to the power switch;
   wherein a level variation of the reference voltage signal is referred by the controller unit, such that the controller unit is configured to properly regulate a duty cycle of the switch controlling signal based on a duty cycle reduction percentage as the LLC resonant converter is under a light-load or a no-load operation;
   wherein the duty cycle reduction percentage is a ratio between a light-load duty cycle and a basic duty cycle within a range from 88% to 99%;
   wherein the level variation of the reference voltage signal is referred by the controller unit, such that the controller unit is also able to regulate the duty cycle of the switch controlling signal based on a duty cycle increment percentage as the LLC resonant converter is under a normal load operation;
   wherein the duty cycle increment percentage is a ratio between the basic duty cycle and the light-load duty cycle within a range from 102% to 112%.

2. The control circuit of claim 1, wherein the light-load duty cycle is less than the basic duty cycle.

3. The control circuit of claim 1, further comprising:
   an isolation transformer unit, being electrically connected between the controller unit and the power switch unit.

4. The control circuit of claim 1, wherein the LLC resonant converter works at a fixed frequency mode.

5. The control circuit of claim 1, wherein the controller unit is able to determine either the LLC resonant converter is under a full-load or the light-load operation based the reference voltage signal generated by the signal detection unit; wherein 70 percent or less of the reference voltage signal obtained during full-load operation is equal to the reference voltage signal got during light-load operation.

6. The control circuit of claim 1, wherein the LLC resonant converter further comprises a plurality of output rectification units.

7. The control circuit of claim 6, wherein the transformer unit has a primary-side winding and a plurality of secondary-side windings, moreover, each of the secondary-side windings being connected with one output rectification unit.

* * * * *